(12) United States Patent
Krissell et al.

(10) Patent No.: US 7,318,082 B2
(45) Date of Patent: Jan. 8, 2008

(54) TIME ZONE NEGOTIATION IN A CLIENT-SERVER COMMUNICATION ARCHITECTURE

(75) Inventors: Daniel L. Krissell, Kirkwood, NY (US); Thomas E. Murphy, Jr., Vestal, NY (US); Francine M. Orzel, Endicott, NY (US); Kelly Parasida, Endicott, NY (US); Paul F. Rieth, Apalachin, NY (US); Jeffrey S. Stevens, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 10/154,039

(22) Filed: May 22, 2002

(65) Prior Publication Data

US 2003/0220965 A1 Nov. 27, 2003

(51) Int. Cl.
*G06F 15/16* (2006.01)
(52) U.S. Cl. ............... 709/203; 709/219; 709/223; 709/225; 709/230; 709/237
(58) Field of Classification Search ........... 709/203, 709/209, 225, 237, 223, 219, 231
See application file for complete search history.

(56) References Cited

U.S. PATENT DOCUMENTS

| 5,845,257 | A | 12/1998 | Fu et al. |
| 6,016,478 | A | 1/2000 | Zhang et al. |
| 6,061,716 | A | 5/2000 | Moncreiff |
| 6,141,752 | A | 10/2000 | Dancs et al. |
| 6,154,768 | A * | 11/2000 | Chen et al. ............ 709/203 |
| 6,157,618 | A | 12/2000 | Boss et al. |
| 6,182,142 | B1 | 1/2001 | Win et al. |
| 6,198,696 | B1 | 3/2001 | Korpi et al. |
| 6,510,556 | B1 * | 1/2003 | Kusaba et al. ............ 725/93 |
| 6,850,941 | B1 * | 2/2005 | White et al. ............ 707/10 |
| 2002/0065875 | A1 * | 5/2002 | Bracewell et al. ......... 709/203 |
| 2003/0093465 | A1 * | 5/2003 | Banerjee et al. ......... 709/203 |
| 2003/0115258 | A1 * | 6/2003 | Baumeister et al. ...... 709/203 |

* cited by examiner

*Primary Examiner*—Yves Dalencourt
(74) *Attorney, Agent, or Firm*—Schmeiser, Olsen & Watts

(57) ABSTRACT

A method, system, and software associated with a client-server communication architecture in which there is a server and one or more clients. A client of the one or more clients communicates the client's time zone value to the server over a communication path and during a communication-session between the client and the server. The time-zone value is so communicated through options negotiations between the client and the server. The negotiated time-zone value is stored in a storage area of a computer system that includes the server.

28 Claims, 8 Drawing Sheets

TIME ZONE NEGOTIATION IN A CLIENT-SERVER COMMUNICATION ARCHITECTURE

BACKGROUND OF THE INVENTION

1. Technical Field

The present invention relates to a method, system, and software associated with a client-server communication architecture that exploits communication of the client's time zone by the client to the server.

2. Related Art

In a client-server communication architecture, it may be desirable for the server to know features of the client's location. Unfortunately, the server may have a need to know particular features of the client's location but may not have knowledge of such features. Thus, there is a need for a method, system, and software that facilitates knowledge by the server of particular features of the client's location.

SUMMARY OF THE INVENTION

In first embodiments, the present invention provides a client-server communication method, comprising for each i of i=1, 2, ..., N such that N is at least 1: receiving, by a server from a client $C_i$ over a communication path and during a communication session $S_i$ between the client $C_i$ and the server, a negotiated time-zone value $V_i$ that identifies a time zone of the client $C_i$, wherein receiving the negotiated time-zone value $V_i$ includes receiving the negotiated time-zone value $V_i$ in a storage area of a computer system that includes the server.

In second embodiments, the present invention provides a client-server communication method, comprising: transmitting, from a client to a server over a communication path and during a communication session between the client and the server, a negotiated time-zone value that identifies a time zone of the client.

In third embodiments, the present invention provides a client-server communication system comprising a server, and for each i of i=1, 2, ..., N such that N is at least 1: wherein the server is adapted to receive from a client $C_i$, in a storage area of a computer system that comprises the server and over a communication path between the client $C_i$ and the server and during a communication session $S_i$ between the client $C_i$ and the server, a negotiated time-zone value $V_i$ that identifies a time zone of the client $C_i$.

In fourth embodiments, the present invention provides a client-server communication system comprising a client adapted to transmit to a server, in a storage area of the server and over a communication path between the client and the server and during a communication session between the client and the server, a negotiated time-zone value that identifies a time zone of the client.

In fifth embodiments, the present invention provides computer software comprising a software application adapted to be initiated by a client of a client-server communication system during a communication session between the client and a server of the client-server communication system, wherein the client-server communication system has a communication path between the client and the server, wherein the software application is further adapted to execute on the server during the communication session, and wherein to execute the software application includes to make a decision relating to a negotiated time-zone value that identifies a time zone of the client.

In sixth embodiments, the present invention provides a computer software comprising a software application adapted to be initiated from within a computer system that includes a server of a client-server communication system during a communication session between the server and a client of the client-server communication system, wherein the client-server communication system has a communication path between the client and the server, wherein the software application is further adapted to execute on the server during the communication session, and wherein to execute the software application includes to make a decision relating to a negotiated time-zone value that identifies a time zone of the client.

In seventh embodiments, the present invention provides a computer program product, comprising a computer usable medium having a computer readable program code embodied therein, wherein the computer readable program code comprises a software application adapted to be initiated by a client of a client-server communication system during a communication session between the client and a server of the client-server communication system, wherein the client-server communication system has a communication path between the client and the server, wherein the software application is further adapted to execute on the server during the communication session, and wherein to execute the software application includes to make a decision relating to a negotiated time-zone value that identifies a time zone of the client.

In eighth embodiments, the present invention provides a computer program product, comprising a computer usable medium having a computer readable program code embodied therein, wherein the computer readable program code comprises a software application adapted to be initiated from within a computer system that includes a server of a client-server communication system during a communication session between the server and a client of the client-server communication system, wherein the client-server communication system has a communication path between the client and the server, wherein the software application is further adapted to execute on the server during the communication session, and wherein to execute the software application includes to make a decision relating to a negotiated time-zone value that identifies a time zone of the client.

Thus in a client-server communication architecture, the present invention facilitates knowledge by the server of particular features of the client's location wherein the server has a need to know such features.

DETAILED DESCRIPTION OF THE INVENTION

Figure 1:
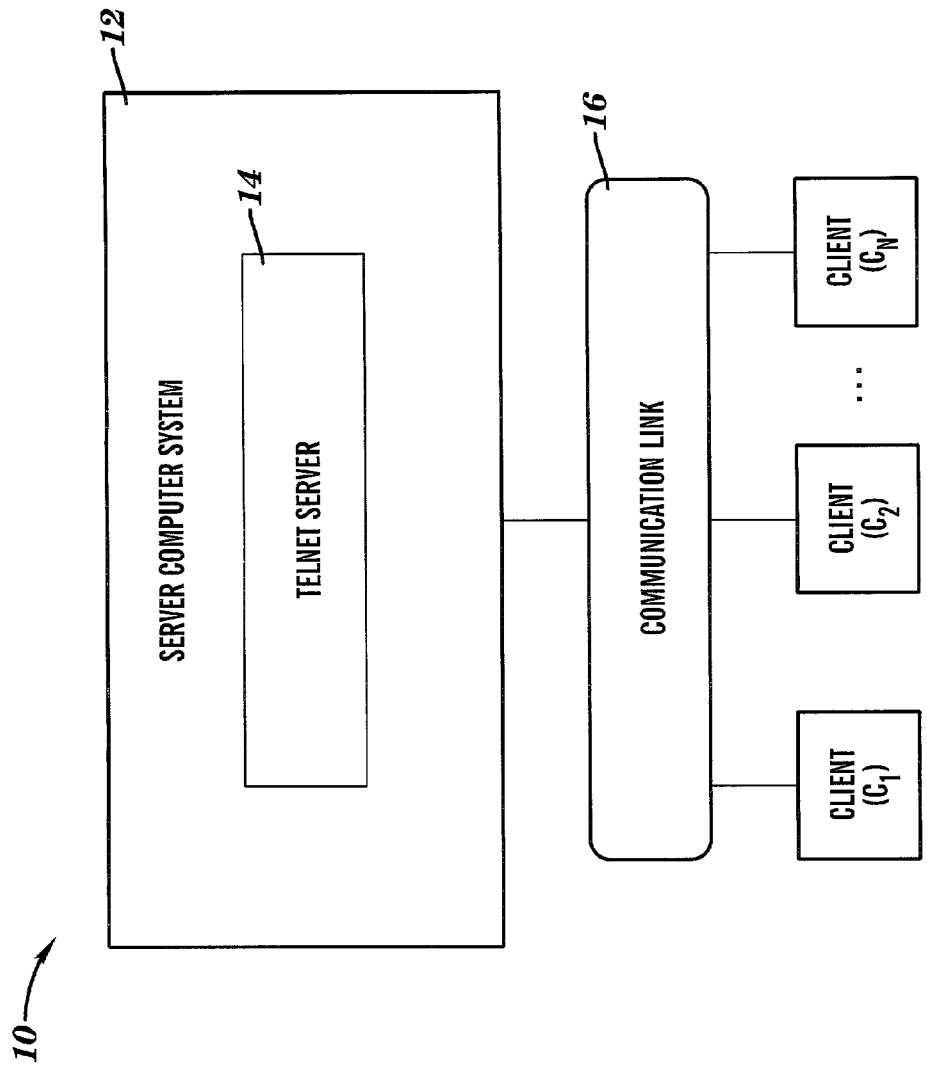
FIG. 1 is a simplified block diagram of a client-server communication system showing clients communicating with a server within a server computer system, in accordance with embodiments of the present invention.

FIG. 1 is a simplified block diagram of a client-server communication system 10 showing N clients communicating with a Telnet server 14 within a server computer system 12 over a communication path that includes a communication link 16, in accordance with embodiments of the present invention. The server computer system 12 generally represents any computer system, including hardware and software, such as the iSeries (AS/400) computer system. The Telnet server 14 generally represents any server within the framework of a client-server communication system. The N connecting clients are symbolically represented as $C_1$, $C_2$, . . . , $C_N$, wherein N is a positive integer of at least 1. The client-server communication system 10 conforms to a client-server architecture in which the N clients utilize the hardware and software resources of the server computer system 12 to execute data processing functions such as, inter alia, executing software applications which exist within the server computer system 12 (e.g., application programs such as accounting programs, statistical programs, engineering programs, spreadsheet software, word processing software, etc.) but which are initiated by the clients. The embodiments of the present invention described herein in terms of terminal emulation over a network (Telnet), namely terminal emulation over the communication link 16 which may comprise, inter alia, a Transmission Control Protocol/Internet Protocol (TCP/IP) network.

The N clients may be distributed geographically such that different clients are in different time zones, and at least one of such clients is in a different time zone than the time zone in which the server computer system 12 is located. For example if N=2, the server computer system 12 may be located in Chicago (Central time), while the client $C_1$ may be located in Boston (Eastern time) and the client $C_2$ may be located in Seattle (Pacific time).

For the present invention, a "time-zone value" (V) of a client is defined herein by the equation $V=Z-\Delta$. Z is the number of time zones that the client's geographical location is west of Greenwich, England. For most locations on Earth, a time zone is equivalent to 15 degrees of longitude or one hour of time. As an example, the city of Boston, Mass. has Z=5 where the longitude is 71 degrees, 4 minutes west of Greenwich. As another example, the city of Budapest in Hungary has Z=−1 where the longitude is 19 degrees, 5 minutes east of Greenwich.

The parameter $\Delta$ in the definition of the time-zone value V is an adjustment due to Daylight Savings Time (DST), wherein: $\Delta=0$ if DST is not in effect at the client when the client is connected to the Telnet server 14; $\Delta=-1$ if DST is in effect at the client location when the client is connected to the Telnet server 14 and the client is located west of Greenwich; and $\Delta=+1$ if DST is in effect at the client location when the client is connected to the Telnet server 14 and the client is located east of Greenwich. Under the preceding definition, the time-zone value V for a client in a fixed geographical location may vary during the year due to Daylight Savings Time. Thus V=5 in Boston during the winter season when DST is not in effect, and V=4 in Boston during the winter season when DST is in effect. On the other hand, V=7 in Phoenix, Ariz. throughout the year, since the state of Arizona does not observe Daylight Savings Time. With the present invention, the absolute value of V is not crucial; what is important for the present invention is an ability for the Telnet server 14 to know the value of the difference in V between the client and the Telnet server 14. Thus, the difference in V, namely $\delta V$, between a server in Phoenix and a client in Boston is $\delta V=2$ during the winter season when DST is not in effect, and $\delta V=3$ during the summer season when DST is in effect.

Any format for describing V is within the scope of the present invention. One such format is the text form of "GMT-V", wherein "GMT" stands for Greenwich Mean Time. For example, the time zone in Boston, Mass. may be expressed as "GMT-5" when DST is not in effect (e.g., during the winter season), and as "GMT-4" when DST is in effect (e.g., during the summer season). With the preceding format, the expression "GMT-5 may be viewed either as a time zone or a time-zone value. As another example, the time zone in Phoenix, Ariz. may be expressed as "GMT-7" throughout the year since the state of Arizona does not observe Daylight Savings Time. Alternatively, V may be expressed as a number, so that for the preceding example, the time-zone value V in Boston may be expressed as 5 or 5.00 when DST is not in effect and as 4 or 4.00 when DST is in effect, and the time-zone value V in Phoenix, Ariz. may be expressed as 7 or 7.00 throughout the year. With the preceding format, the expression 5 or 5.00 may be viewed either as a time zone or a time-zone value. As another alternative, an Eastern time-zone location may be expressed as the text: EST denoting Eastern Standard Time during the winter when DST is not in effect, and as EDT denoting Eastern Daylight Time during the summer when DST is in effect. With the preceding format, the expression "EST" or "EDT" may be viewed either as a time zone or a time-zone value. There is no limitation as to the form in which the time zone or time-zone value V may be expressed. It is even within the scope of the present invention to bias V by a constant additive factor such as +12 or any other additive constant, for any desired purpose such as, inter alia, to ensure that V never has a negative value, so that with a +12 bias V=5 would be converted to V=17. If such a bias is employed, then said bias should be used consistently (i.e., at both the server location and the client location).

The "time zone" of a geographic location has the same definition as "time-zone value." Thus the terms "time zone" and "time-zone value" could be used interchangeably depending on context. For example, "time zone" and "time-zone value" could be expressed in any format as discussed supra. When used in a mathematical sense, however, such as in the equation $V=Z-\Delta$, the time zone or time-zone value is understood to have a numerical expression such as 5 or 5.00.

Since the sum of clock time and time-zone value is invariant with respect to geographical location, the clock time $T_2$ of a second geographical location may be computed from knowledge of the clock time $T_1$ of a first geographical location from the relation $T_2+V_2=T_1+V_1$, or $$T_2=T_1-(V_2-V_1) \tag{1}$$

wherein $V_1$ and $V_2$ is the time-zone value of the first geographical location and the second geographical location, respectively. For example, if the clock time $T_1$ at a server in Chicago is 11 (i.e., 11:00 AM), and if the time-zone value $V_1$ is 6 for Chicago, and if the time-zone value $V_2$ is 8 for Los Angeles, the clock time $T_2$ at a client in Los Angeles may be calculated from Equation (1) via $T_2=11-(8-6)=9$ (i.e., 9:00 AM).

For some application, there is a need for the server computer system 12 to be aware of the time zones of the N connecting clients. A first example of when the server computer system 12 needs to be aware of the time-zone value of a connecting client is when a software application, that is stored within the server computer system 12 and has been initiated by a client that is running on the Telnet server 14, needs to know the local time at the client's geographical location. For example, the server computer system 12 and the client may be respectively located in Chicago and Boston, and the application is required, at 9 PM at the client's location (i.e., in Boston), to display a message on the computer screen of the client that informs the client that it is time to disconnect from the server computer system 12 at the Boston site. Without the present invention, the server computer system 12 knows only the clock time of the server computer system 12 in Chicago, but does not know the clock time of the client in Boston, because the application is running on the Telnet server 14 in Chicago and not on the client in Boston. As will be seen infra, however, the present invention teaches how to make the server computer system 12 aware of the client's time zone in Boston, so that the application can perform its task that requires knowledge of the client's local time. In this first example, the application may be programmed to automatically disconnect the client from the Telnet server 14 if the client has not disconnected within a predetermined amount of X minutes (e.g., 5 minutes, 10 minutes, etc.) after said message has been displayed on the computer screen of the client. Note that with the present invention as will be described infra in detail, the application is able to determine whether to take an action relating to a client (e.g., send a message to the client, disconnect the client, etc.) based on whether a condition depending on the client's time zone is satisfied.

A second example of when the server computer system 12 needs to be aware of the time zone of a connecting client is when a software application, that is stored on and initiated from within the server computer system 12, is running on the Telnet server 14. In this second example, this software application needs to know the local time of the client. For example, consider a situation in which the N clients each represent a store of a corporation, and each such client saves its data in a separate file in the server computer system 12. Also, assume that the server computer system 12 is located in Chicago. The system administrator at the server computer system 12 gathers data at the end of each day to generate reports. The system administrator wishes to deploy said software application to automatically open the files, retrieve the data, and generate report(s). Since the clients are geographically distributed (such as around the world), the software application would be running a large portion of the day as measured in clock time at the server computer system 12 (i.e., at Chicago in the Central time zone), because if each store closes a 9 PM in the local time of the store then stores in the Eastern time zone would close at 8 PM Central time and stores in the Pacific time zone would close at 11 PM Central time. This software application would not work properly due to the fact that the software application cannot open the files when clients are still connected to the Telnet server 14 at the end of the business day with the files locked open. With the present invention, however, the software application would be able to ascertain the time zone of each connected client and therefore send a message to each such client at about 9 PM in the local time of the client, wherein the message would instruct the client to disconnect from the client-server session within X minutes (e.g., within 5 minutes, 10 minutes, etc.). In this second example, the software application may be programmed to automatically disconnect the client from the Telnet server 14 if the client has not disconnected within said X minutes. Note that with the present invention as will be described infra in detail, the application is able to determine whether to take an action relating to the client (e.g., send a message to the client, disconnect the client, etc.) based on whether a condition depending on the client's time zone is satisfied. Also note that the system administrator may alternatively intervene manually to initiate sending a message to the client and/or disconnecting the client, based on knowledge of the client's time zone as will be described infra in accordance with the present invention.

In summary from the preceding examples, and assuming that the server computer system 12 has access to knowledge of the time zone of each connecting client, the present invention as described infra in detail enables a software application, stored generally at the site of the server computer system 12 and executing during the session at the server computer system 12, to determine whether to take an action relating to each client based on whether a condition involving the client's time zone is satisfied. The action may include, inter alia, at least one of: communicating a message to the client and terminating the session between the client and the Telnet server 14. The software application stored at the server computer system 12 may be initiated by the client or may be initiated from within the server computer system 12 (e.g., by the system administrator). As will be described infra, the server computer system 12's access to knowledge of the time zone of each connecting client may be either of two forms. In a first form, the client time zone is stored explicitly in a storage area of the server computer system 12. In a second form, the client time zones are embedded as a generic root of a name of a logical subsystem to which the client session has been routed so that access to the time zone involves parsing the name of the logical subsystem.

The embodiments of the present invention are described herein in terms of the Telnet protocol and the client transmits an identification of its local time zone to the server computer system 12 during options negotiations (e.g., Telnet options negotiations) between the client and the Telnet server 14. When the client first connects to the server computer system 12, the client and the Telnet server 14 are each assumed to exist with a Network Virtual Terminal (NVT), which is an imaginary device providing a standard, network-wide intermediate representation of a canonical terminal. The NVT eliminates a need for the client and Telnet server 14 to keep information about the characteristics of each other's terminal. The NVT functions as a bidirectional character device that provides basic services in accordance with the principle of negotiated options. To establish an option after the client connects to the server computer system 12 through the communication link 16, either the client or the Telnet server 14 initiates a request that the option take effect. The other party may then either accept the request or reject the request. If the option request is accepted, the option immediately takes effect. If the option request is rejected, then the associated aspect of the connection remains as specified for an NVT.

The Telnet commands for negotiating options comprise: WILL, WONT, DO and DON'T. WILL and WONT express a desire and refusal, respectively, to perform the option. DO and DON'T express a desire that the other party perform or stop performing, respectively, the option. A Telnet command includes at least a two-byte sequence: the Interpret As Command (IAC) escape character followed by the code for the command. More sophisticated negotiations between dissimilar devices are called subnegotiations which utilize the Subnegotiation Begin (SB) command, followed by the option code, followed by option parameters or values, and finally followed-by the Subnegotiation End (SE) command.

Table 1 infra presents a sample negotiation of options between the client and the Telnet server 14, wherein the time zone of the client is negotiated through use of an environment variable called TIMEZONE.

TABLE 1

Sample Negotiations, Including Time Zone Negotiations

| Row | Telnet Server | Telnet Client |
|---|---|---|
| 1 | IAC DO NEW-ENVIRON | IAC WILL NEW-ENVIRON |
| 2 | IAC DO TERMTYPE | IAC WILL TERMTYPE |
| 3 | IAC SB NEW-ENVIRON SEND USERVAR "RSEEDxxxxxxxx" USERVAR "SUBSPW" VAR USERVAR IAC SE | IAC SB NEW-ENVIRON IS VAR "USER" VALUE "KRISSELL" USVAR "RSEED" VALUE USERVAR "SUBSPW" VALUE "yyyyyyyy" USERVAR "DEVNAME" VALUE "DLK" USERVAR "CODEPAGE" VALUE "37" USERVAR "CHARSET" VALUE "697" USERVAR "KBDTYPE" VALUE "USB" USERVAR "TIMEZONE" VALUE "GMT-5" IAC SE |
| 4 | IAC SB TERMTYPE SEND IAC SE | IAC SB TERMTYPE IS IBM-3179-2 IAC SE |
| 5 | IAC DO EOR | IAC WILL EOR |
| 6 | IAC WILL EOR | IAC DO EOR |
| 7 | IAC DO BINARY | IAC WILL BINARY |
| 8 | IAC WILL BINARY | IAC DO BINARY |
| 9 | RFC 1205 Data Stream | |

In Table 1, the chronological sequence of negotiating commands is: Row 1 (Telnet Server), Row 1 (Telnet Client), Row 2 (Telnet Server), Row 2 (Telnet Client), . . . , Row 9 (Telnet Server). In row 1, the NEW-ENVIRON option facilitates definition and transmission of new environment variables. In row 2, the TERMTYPE option facilitates definition of the type of terminal connected to a user Telnet terminal. In the subnegotiation of row 3, the client transmits various environment variables to the Telnet server 14, including the environment variable DEVNAME having the value "DLK" and the environment variable TIMEZONE having the value "GMT-5" (i.e., Greenwich Mean Time minus 5 hours). Row 9 denotes sending out the first data stream, signifying the end of negotiations. The client may encode and communicate the time-zone value to the Telnet server 14 in any desired format ("e.g., GMT-5", "5", "GMT-5.00", etc.).

In Table 1, the client negotiates use of the environment variable TIMEZONE to communicate the client's time zone to the server computer system 12. The time-zone value, namely "GMT-5" is received by the server computer system 12 in a memory storage area such as in a logical unit descriptor (LUD) space. Alternatively or additionally, the client's time-zone value could have been communicated as a generic root of another environment variable such as the device name (i.e., DEVNAME in Table 1) or the device type. For example, if the client were located in the Eastern time zone, then the client could have caused DEVNAME, which also denotes the job name, to have the value of "EAST001" wherein the generic root "EAST" indicates that the client is located in the Eastern time zone. Similarly, if the client were located in the Central time zone, then the client could have caused DEVNAME to have the value of "CENT018" wherein the generic root "CENT" indicates that the client is located in the Central time zone. Such use of generic roots in environment variables to communicate the client's time zone facilitates the use of logical subsystems for enabling the operating system of the server computer system 12 to identify the time zone of the client (i.e., of client's session). A logical subsystem based on time zone comprises a logical segregation of client jobs and associated job names in subsystems (i.e., groups) such that all client jobs in a given subsystem have the same time-zone generic root (e.g., EAST, CENT, etc.). Embodiments of the present invention based on logical subsystems will be discussed infra in conjunction with FIGS. 5-7.

Embodiments of the present invention comprise two methods of processing and utilizing client time-zone values. The first method is labeled herein as the "LUD Method" (i.e., logical unit descriptor method) as described in conjunction with FIGS. 2-4. The second method is labeled herein as the "Logical Subsystem Method" as described in conjunction with FIGS. 5-7.

Figure 2:
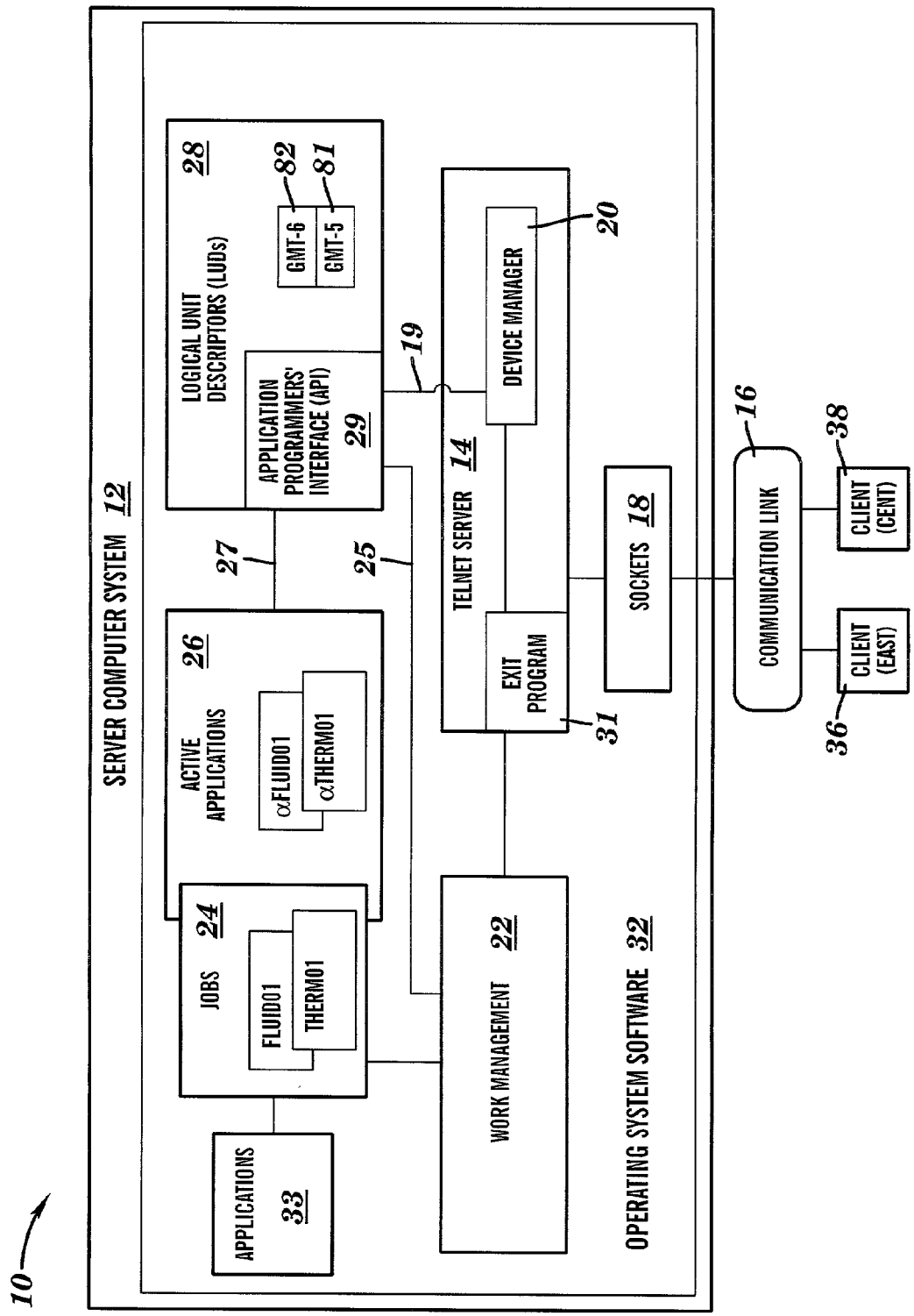
FIG. 2 depicts the client-server communication system of FIG. 1 with client time zones accessed in the server computer system through logical unit descriptors, in accordance with embodiments of the present invention.

FIG. 2 depicts the client-server communication system of FIG. 1 with client time zones accessed in the server computer system through logical unit descriptors (LUDs), in accordance with LUD Method embodiments of the present invention. Note that FIG. 2 shows the server computer system 12 in much more detail than does FIG. 1.

In FIG. 2, two clients are shown as connected to the server computer system 12, namely client 36 located in the Eastern time zone and client 38 located in the Central time zone. Generally, N clients may be connected to the server computer system 12, wherein N is any positive integer of at least 1 including any value of 2 or more. The clients 36 and 38 each communicate to the Telnet server 14 of the server computer system 12 through the communication link 16 (e.g., the Internet) wherein sockets 18 serve as a software interface (e.g., an Application Programmers' Interface; i.e., "API") between the Telnet server 14 and the communication link 16 (e.g., a TCP/IP network).

The Telnet server 14 comprises a device manager 20 and specialized software such as the exit program 31. The device manager 20 includes software that interacts with the operating system (OS) that is active on the server computer system 12. The device manager 20 handles session opening (which includes virtual device creation) and session termination.

The server computer system 12 includes hardware as well as operating system software 32. The operating system software 32 includes, inter alia, sockets 18, Telnet server 14, work management 22, applications 33, etc. Work management 22 manages tasks, including resource management and time management, and routing of jobs (e.g., jobs 24) to an interactive subsystem. Jobs 24 depict active jobs running on the server computer system 12. In FIG. 2, job THERM01 is a job of client 36 and job FLUID01 is a job of client 38.

The clients 36 and 38 each run transaction-based interactive jobs (e.g., jobs 24) on the server computer system 12 and each of said jobs 24 may be each be an instantiation of one or more shared applications such that each such job maintains a different state of the one or more shared applications. The server computer system 12 runs the one or more shared application instances for each client, and the server computer system 12 keeps track of the state of each such instance.

Active applications 26 are associated with jobs 24. For example active applications αTHERM01 and αFLUID01 are respectively associated with jobs THERM01 and FLUID01. The active applications 26 may be drawn from the applications 33 (through the jobs 24) such that the active applications 26 are "active" (i.e., in a state of being executed), while the applications 33 from which the active applications 26 are drawn are in a stored but not executing state.

After the client 36 (or the client 38) connects to the server computer system 12, options are negotiated between the client 36 and the Telnet server 14, and during said negotiating the client 36 transmits its time-zone value (e.g., GMT-5, GMT-6, etc.) to the Telnet server 14 as discussed supra. The time-zone value will be stored in a storage area of the server computer system 12 such as in a logical unit descriptor (LUD) associated with each session. In FIG. 2, such a storage area is denoted as the LUD space 28, comprising: a LUD 81 that contains the time-zone value of "GMT-5" of the client 36; and a LUD 82 that contains the time-zone value of "GMT-6" of the client 38, as shown in FIG. 2. Each such LUD in the LUD space 28 is fully accessible to the operating system and thus also accessible to any software (e.g., an application program of applications 33) that is running on the server computer system 12 as one of the active applications 26. The time-zone value may be so accessed from the LUD space 28 through the operating system software 32 (e.g., by use of the API 29). For example, the active applications 26 have access to the LUD space 28 via link 27. Similarly, the device manager 20 and the work management 22 has access to the LUD space 28 via link 19 and 25, respectively.

Figure 3:
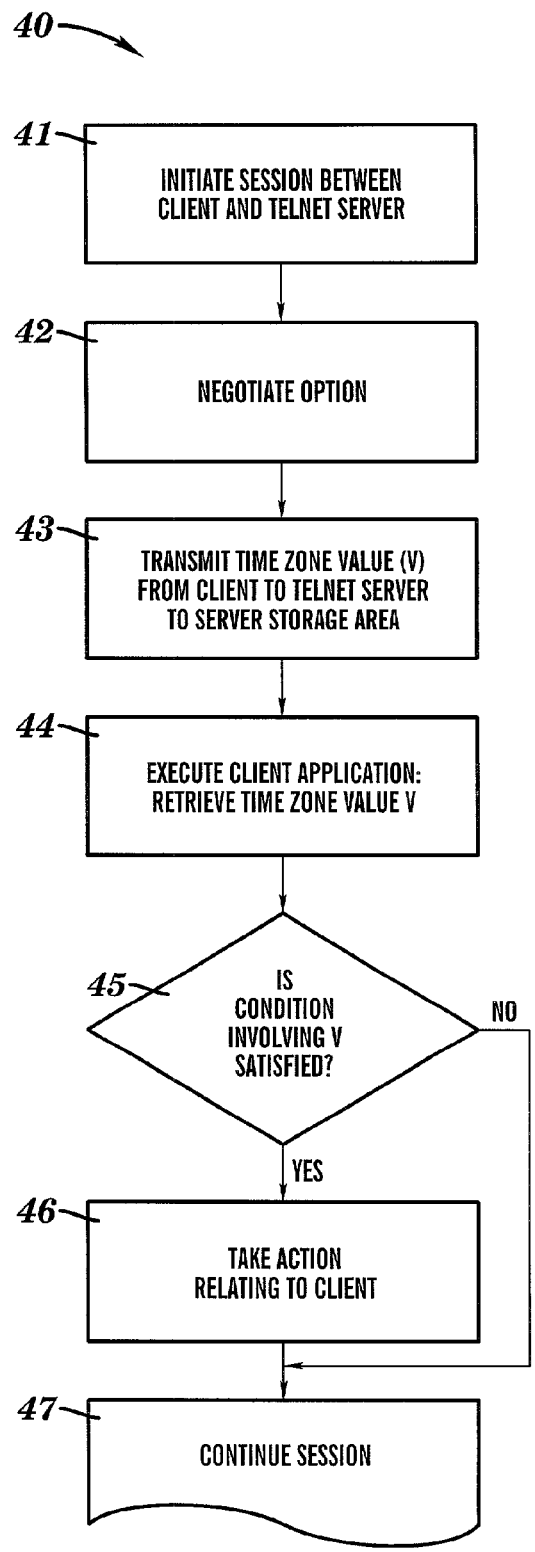
FIGS. 3 and 4 are flow charts describing methods for processing the client time zones in the server computer system of FIG. 2, in accordance with embodiments of the present invention.
Figure 4:
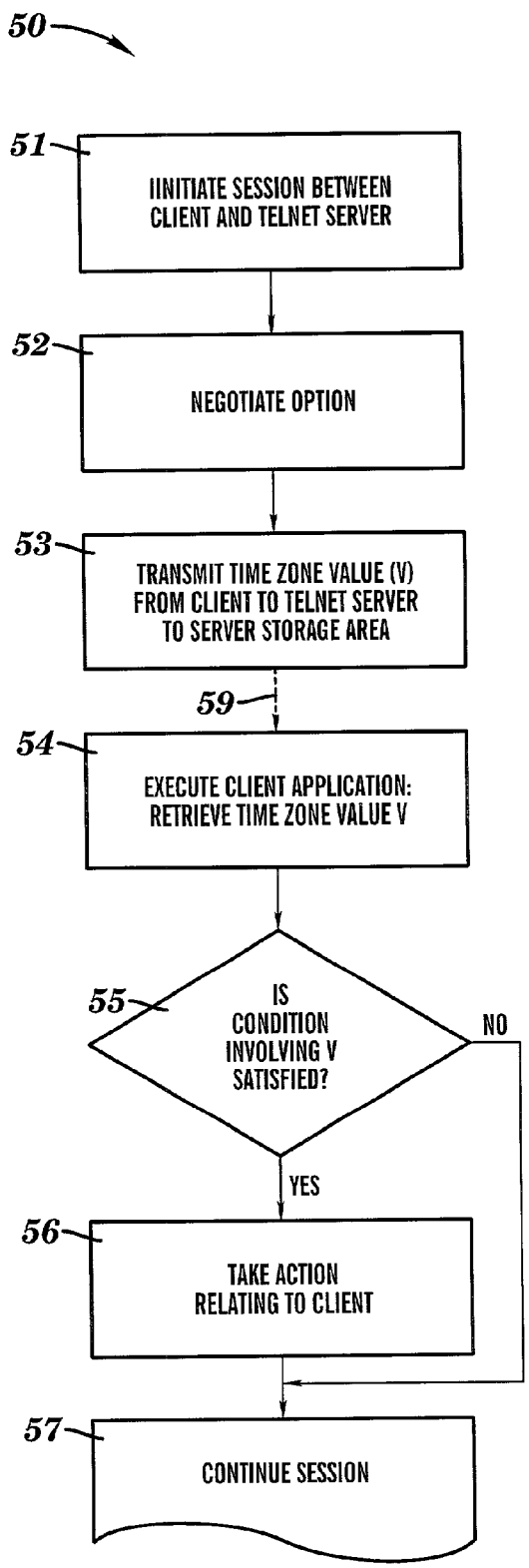

FIG. 2 shows all active applications 26 as bundled together. Each such active application can determine the time zone-value of the client (for whom said active application is being executed) by using the "LUD Method;" i.e., by accessing said time zone value in the LUD space 28 as explained supra. FIGS. 3 and 4 illustrate different embodiments for utilizing said time-zone values.

FIG. 3, in conjunction with the client-server communication system 10 of FIG. 2, is a flow chart 40 which depicts steps 41-47 for using the LUD method for accessing client time-zone values for client applications. In step 41, a session is initiated between the client 36 (or the client 38) and the Telnet server 14. In step 42, options are negotiated between the client 36 and the Telnet server 14. Step 43 reflects a result of the option negotiations of step 42, including communication by the client 36 to the Telnet server 14 of the time-zone value V (i.e., "GMT-5") of the client 36. The time-zone value V is placed in a storage area (e.g., the LUD space 28) of the server computer system 12, as explained supra. In step 44, the active application 26 (i.e., αTHERM01 as shown in FIG. 2) of the client 36 is being executed and during said execution, the active application αTHERM01 retrieves the client's time zone value V from the LUD space 28. Next, step 45 determines whether a condition involving V is satisfied. In a first example, the condition to be tested may be the condition that V denotes the Eastern time zone. In this first example, the condition to be tested in step 45 enables the active application to identify clients in the Eastern time zone for any purpose such as for backing up the client's data (at the client's location) at the end of the day at 9 PM local client time while taking no such action for clients in other time zones where the time is not 9 PM local client time. The "local client time" is the clock time at the geographical location of the client. In a second example, the condition to be tested may be the condition that V does not depart from the Central time zone by more than one hour. This condition in the second example will be satisfied if V represents one of the Eastern time zone, the Central time zone, and the Mountain time zone. Generally, the condition involving V that is tested in step 45 can be any desired condition involving V. If the condition involving V in step 45 is satisfied, then step 46 is executed. Step 46 takes an action with respect to the client, said action being relating to the condition involving V that has been satisfied. Thus in the first example discussed supra relating to FIG. 3, if V denotes the Eastern time zone and the condition involving V has been satisfied, then the active application could take an action to transmit a message to the client instructing the client 36 to terminate the session in X minutes (e.g., 5 minutes, 10 minutes, etc.) and to initiate backing up the client's data located at the client's site. If the client 36 does not so terminate the session within said X minutes, then the active application could assertively terminate the session. Next the session is continued in step 47.

FIG. 4, in conjunction with the client-server communication system 10 of FIG. 2, depicts a flow chart 50 having steps 51-57 for using the LUD method for accessing client time-zone values for system applications. The flow chart 50 of FIG. 4 is analogous to the flow chart 40 of FIG. 3, with a difference being that in step 44 of FIG. 3 a client application is executed, whereas in step 54 of FIG. 4 a system application is executed. While both a client application and a system application may both be drawn from applications 33 of the operating system software 32 (see FIG. 2), execution of the client application is initiated by the client (e.g., the client 36) while execution of the system application is initiated from within the server computer system 12 and may have an impact on other active applications (e.g., initiated by a system administrator of the server computer system 12 such as a system application that organizes and backs up the client's data at the end of a day wherein the client's data is stored within the server computer system 12). In step 51, a session is initiated between the client 36 (or the client 38) and the Telnet server 14. In step 52, options are negotiated between the client 36 and the Telnet server 14. Step 53 reflects a result of the option negotiations of step 52, including communication by the client 36 to the Telnet server 14 of the time-zone value V (i.e., "GMT-5") of the client 36. The time-zone value V is placed in a storage area (e.g., the LUD space 28) of the server computer system 12, as explained supra. The dotted line 59 connecting step 53 with step 54 serves to denote that steps 51-53 may be executed for each client that has a session with the Telnet server 14 and that subsequent steps 54-57 are intended to be applied to all such active clients (i.e., clients in session with the Telnet server 14) collectively. Thus, in steps 54-57, the "client" or the client 36 represents each such active client.

In step 54, a system application is being executed and during said execution, the system application retrieves a client's time zone value V from the LUD space 28. Next, step 55 determines whether a condition involving V is satisfied. In a first example, the condition to be tested may be the condition that V denotes the Eastern time zone. In this first example, the condition to be tested in step 55 enables the system application to identify active clients in the Eastern time zone for any purpose such as for backing up the client's data (wherein said client's data is stored at the server computer system 12) at 9 PM local client time while taking no such action for active clients in other time zones where the time is not 9 PM local client time. In a second example, the condition to be tested may be the condition that V does not depart from the Central time zone by more than one hour. This condition in the second example will be satisfied if V represents one of the Eastern time zone, the Central time zone, and the Mountain time zone.

Generally, the condition involving V that is tested in step 55 can be any desired condition involving V. If the condition involving V in step 55 is satisfied, then step 56 is executed. Step 56 takes an action with respect to the client 36, said action being relating to the condition involving V that has been satisfied. Thus in the first example discussed supra relating to FIG. 4, if V denotes the Eastern time zone and the condition involving V has been satisfied, the system application could take an action to transmit a message to active clients in the Eastern time zone instructing the client 36 to terminate the session in X minutes (e.g., 5 minutes, 10 minutes, etc.) so that the system application could initiate backing up the client's data. If the client 36 does not so terminate the session within said X minutes, then the system application could assertively terminate the session; alternatively the system administrator could assertively terminate the session either manually or by use of software. Next the session is continued in step 57.

Figure 5:
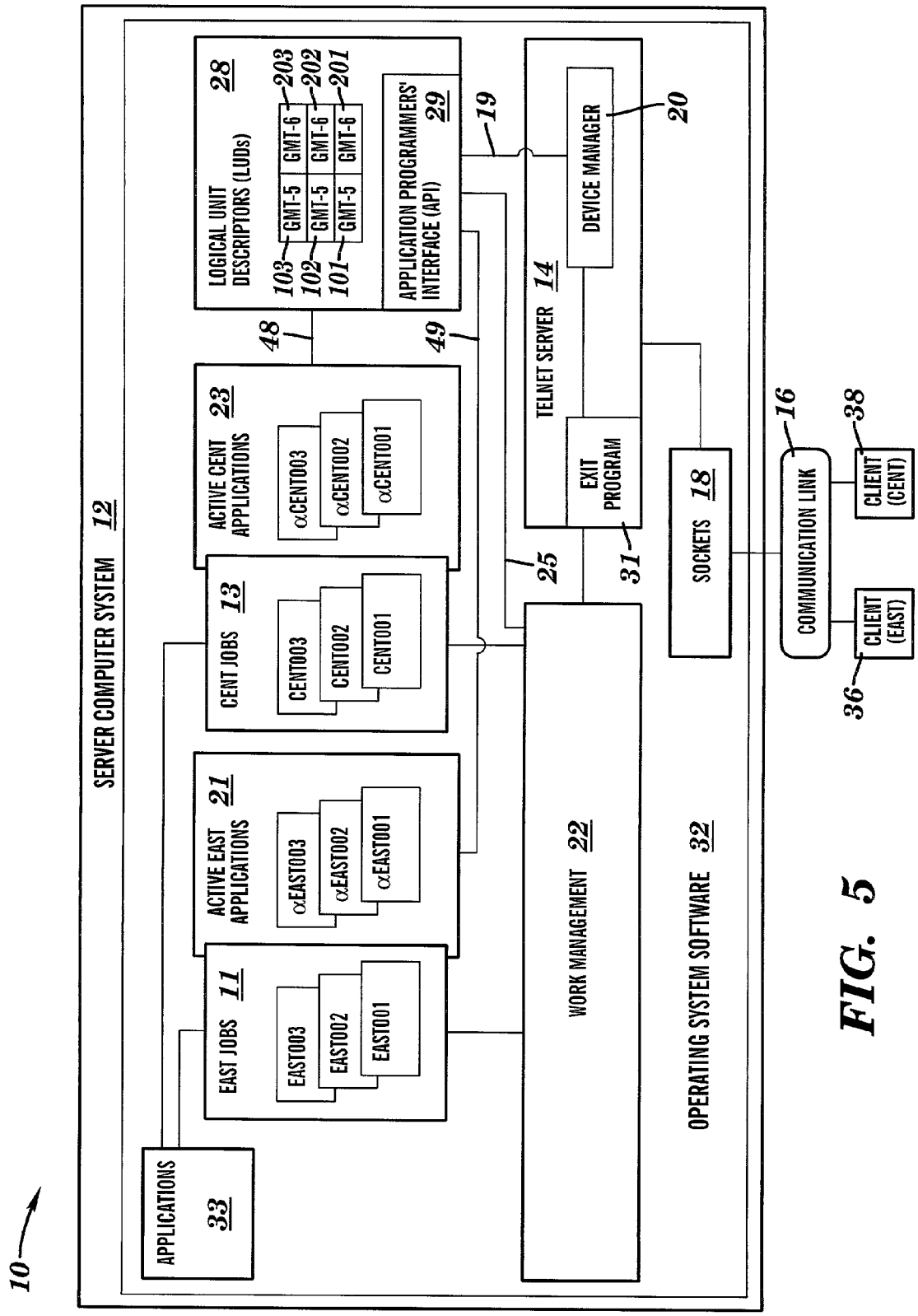
FIG. 5 depicts the client-server communication system of FIG. 1 with client time zones accessed in the server computer system through logical subsystems, in accordance with embodiments of the present invention.

FIG. 5 depicts the client-server communication system 10 of FIG. 1 with client time zones accessed in the server computer system 12 through logical subsystems, in accordance with Logical Subsystem Method embodiments of the present invention. Note that FIG. 5 shows the server computer system 12 in much more detail than does FIG. 1. The Logical Subsystem Method embodiments depicted in FIG. 5 differ from LUD Method embodiments depicted in FIG. 2 in that the jobs 24 and active applications 26 of FIG. 2 have been replaced by the EAST jobs 11, CENT jobs 13, EAST applications 21, and CENT applications 23 in FIG. 5. Thus all aspects of the server computer system 12 shown in FIG. 2 discussed supra also apply to the server computer system 12 shown in FIG. 5 except for aspects of FIG. 5 discussed infra.

In FIG. 5, client jobs are organized in accordance with logical subsystems such that all client session associated with clients located in a fixed time zone are routed into a single logical subsystem. FIG. 5 shows two such logical subsystems, namely the logical subsystems 11 and 13.

All client sessions and associated client jobs in the Eastern time zone are routed to the logical subsystem 11 (e.g., jobs EAST001, EAST002, EAST003), and all jobs in the Central time zone are routed to the logical subsystem 13 (e.g., jobs CENT001, CENT002, CENT003). The client session or associated client job EAST001 relates to the client 36, and the client sessions and associated client jobs EAST002 and EAST003 relate to other clients in the Eastern time zone.

The client session or associated client job CENT001 relates to the client 38, and the client sessions and associated client jobs CENT002 and CENT003 relate to other clients in the Central time zone. Thus, the client sessions and associated client jobs have been routed to logical subsystems which are keyed to the time-zone value of the client's geographical location. FIG. 5 also shows active EAST applications 21 comprising active EAST applications $\alpha$EAST001, $\alpha$EAST002, and $\alpha$EAST003, respectively associated with Eastern time-zone jobs EAST001, EAST002, and EAST003. Additionally, FIG. 5 shows active CENT applications 23 comprising active CENT applications $\alpha$CENT001, $\alpha$CENT002, and $\alpha$CENT003, respectively associated with Central time-zone jobs CENT001, CENT002, and CENT003.

In FIG. 5, the time-zone values of the connecting clients are stored in the LUD 28 as discussed supra in conjunction with FIG. 2. The LUDs 101, 102, and 103 each include the time-zone value "GMT-5" respectively corresponding to the EAST jobs of EAST001, EAST002, and EAST003 in the logical subsystem 11. The LUDs 201, 202, and 203 each include the time-zone value "GMT-6" respectively corresponding to the CENT jobs of CENT001, CENT002, and CENT003 in the logical subsystem 13. Each of the active applications (e.g., the active EAST applications of $\alpha$EAST001, $\alpha$EAST002, and $\alpha$EAST003; the active CENT applications of $\alpha$CENT001, $\alpha$CENT002, and $\alpha$CENT003) may access the time-zone values in the LUD 28 through an API of the operating system. Similarly, any software of the software operating system 32 may access the time-zone values in the LUD space 28. As with active application $\alpha$THERM01 and $\alpha$FLUID01 in FIG. 2, the active applications $\alpha$EAST001, $\alpha$EAST002, $\alpha$EAST003, $\alpha$CENT001, $\alpha$CENT002, and $\alpha$CENT003 of FIG. 5 may be drawn from the applications 33 of the operating system software 32.

The routing of client sessions and associated client jobs may be implemented by the device manager 20 (through work management 22) by running an exit program 31 that extracts from a negotiated option parameter the time-zone value of the client session being processed. The device manager 20 then receives from the exit program 31 a device name to use for the client session. The device name (which is effectively also the job name) will be associated with the client's time zone value. Thus if the exit program 31 finds a time-zone value of "GMT-5" for the client, then the exit program 31 will know that the client resides in the Eastern time zone and will thus assign a device name (and an equivalent job name that includes the generic root "EAST"). In that manner, the client sessions having associated jobs EAST001, EAST002, and EAST003 are routed by the device manager 20 through work management 22 to the logical subsystem 11. Similarly, the client sessions having associated jobs CENT001, CENT002, and CENT003 are routed by the device manager 20 through work management 22 to the logical subsystem 13.

The active EAST applications ($\alpha$EAST001, $\alpha$EAST002, $\alpha$EAST003) and the active CENT applications ($\alpha$CENT001, $\alpha$CENT002, $\alpha$CENT003) do not need to access time-zone values from the LUD space 28, and instead impliedly access the relevant time-zone values through the root that characterizes the logical subsystem (i.e., the root "EAST" characterizing the logical subsystem 11, and the root "CENT" characterizing the logical subsystem 13).

Nonetheless if desired, the time-zone value may be accessed from the LUD space 28 through the operating system software 32 (e.g., by use of the API 29). For example, the active EAST applications 21 and active CENT applications 21 have access to the LUD space 28 via link 49 and 48, respectively. Similarly, the device manager 20 and the work management 22 has access to the LUD space 28 via link 19 and 25, respectively.

The preceding discussion was directed to routing client sessions and associated client jobs to logical subsystems which are keyed to the time-zone value of the client's geographical location. Instead of using an environment variable such as TIMEZONE, a session attribute such as, inter alia, DEVNAME (i.e., device name) or DEVTYPE (i.e., device type) could be transmitted via options negotiations to effectuate such routing to a logical subsystems which is keyed to said time-zone value. Such use of device name may require each client to configure the device name of its computer, workstation, etc. Generally, said routing to logical subsystems keyed to time-zone value of the client means logical segregation of the sessions and associated jobs through a tag such as a root of any session attribute such as device name, device type, etc. or through use of an environment variable such as TIMEZONE as described supra.

Figure 6:
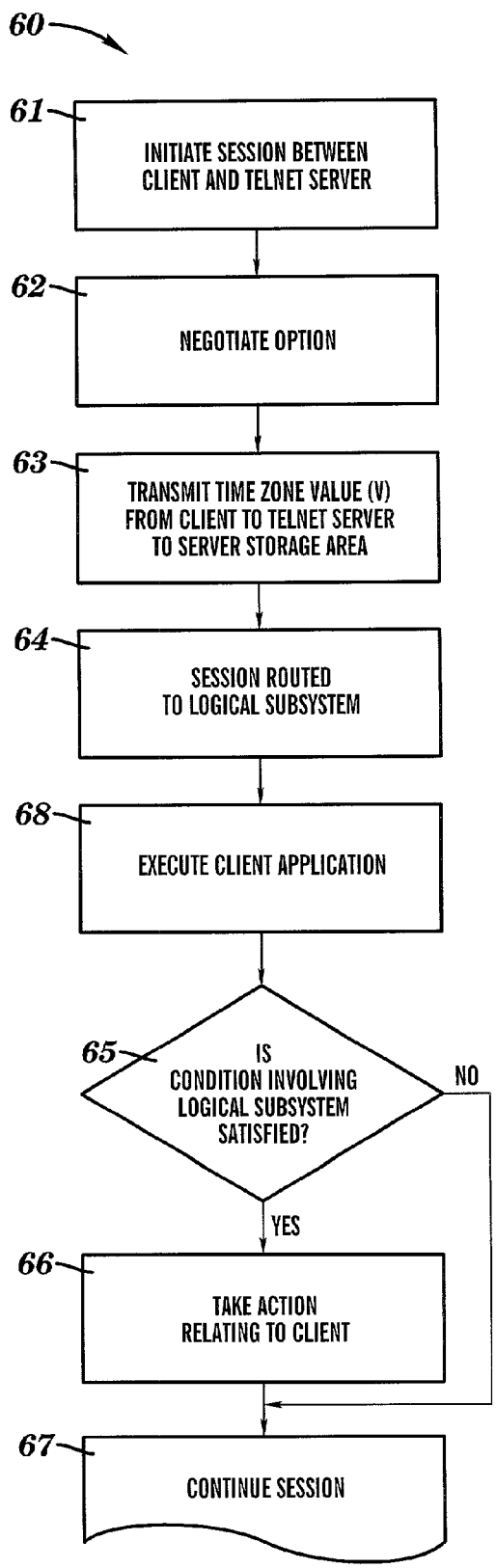
FIGS. 6 and 7 are flow charts describing methods for processing the client time zones in the server computer system of FIG. 5, in accordance with embodiments of the present invention.

FIG. 6, in conjunction with the client-server communication system 10 of FIG. 5, is a flow chart 60 which depicts steps 61-68 for using the Logical Subsystem Method for accessing client time-zone values for client applications. In step 61, a session is initiated between the client 36 (or the client 38) and the Telnet server 14. In step 62, options are negotiated between the client 36 and the Telnet server 14. Step 63 reflects a result of the option negotiations of step 62, namely communication by the client 36 to the Telnet server 14 of the time-zone value V (i.e., "GMT-5") of the client 36. The time-zone value V is placed in a storage area (e.g., the LUD space 28) of the server computer system 12, as explained supra. In step 64, the client session (i.e., EAST001 as shown in FIG. 5) is routed to the appropriate logical subsystem, wherein the device manager 20 makes use of V as found in the options negotiation and accomplishes said routing through work management 22 as described supra. In step 68, the active application (i.e., αEAST001 as shown in FIG. 5) is executed. Next, step 65 determines whether a condition involving the logical subsystem of the session being processed is satisfied. In a first example, the condition to be tested may be the condition that the logical subsystem denotes the Eastern time zone. In this first example, the condition to be tested in step 65 enables the active application to identify clients in the Eastern time zone for any purpose such as for backing up the client's data (at the client's location) at the end of the day at 9 PM local client time while taking no such action for clients in other time zones where the time is not 9 PM local client time. In a second example, the condition to be tested may be the condition that the logical subsystem is one of: the Eastern time zone, the Central time zone, and the Mountain time zone. Generally, the condition involving the logical subsystem that is tested in step 65 can be any desired condition involving said logical subsystem. If the condition involving the logical subsystem in step 65 is satisfied, then step 66 is executed. Step 66 takes an action with respect to the client, said action relating to the condition that has been satisfied. Thus in the first example discussed supra relating to FIG. 6, if the logical subsystem denotes the Eastern time zone and the condition involving the logical subsystem has been satisfied, then the active application could take an action to transmit a message to the client instructing the client 36 to terminate the session in X minutes (e.g., 5 minutes, 10 minutes, etc.) and to initiate backing up the client's data located at the client's site. If the client 36 does not so terminate the session within said X minutes, then the active application could assertively terminate the session. Next the session is continued in step 67.

Figure 7:
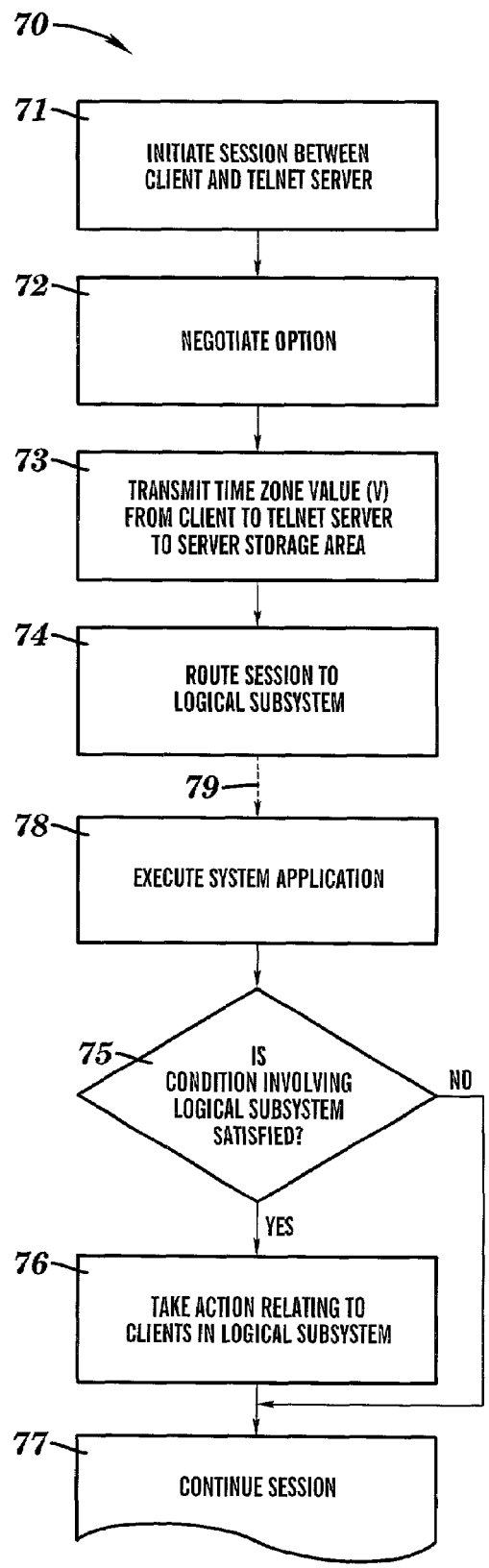

FIG. 7, in conjunction with the client-server communication system 10 of FIG. 5, is a flow chart 70 which depicts steps 71-78 for using the Logical Subsystem Method for accessing client time-zone values for client applications. In step 71, a session is initiated between the client 36 (or the client 38) and the Telnet server 14. The flow chart 70 of FIG. 7 is analogous to the flow chart 60 of FIG. 6, with a difference being that in step 64 of FIG. 6 a client application is executed, whereas in step 74 of FIG. 7 a system application is executed. While both a client application and a system application may both be drawn from applications 33 of the operating system software 32 (see FIG. 5), execution of the client application is initiated by the client (e.g., the client 36) while execution of the system application is initiated from within the server computer system 12 (e.g., initiated by a system administrator of the server computer system 12 such as a system application that organizes and backs up the client's data at the end of a day wherein the client's data is stored within the server computer system 12). In step 72, options are negotiated between the client 36 and the Telnet server 14. Step 73 reflects a result of the option negotiations of step 72, namely communication by the client 36 to the Telnet server 14 of the time-zone value V (i.e., "GMT-5") of the client 36. The time-zone value V is placed in a storage area (e.g., the LUD space 28) of the server computer system 12, as explained supra. In step 74, the client session (i.e., EAST001 as shown in FIG. 5) is routed to the appropriate logical subsystem, wherein the device manager 20 makes use of V as stored in the LUD space 28 and accomplishes said routing through work management 22 as described supra. The dotted line 79 connecting step 74 with step 78 serves to denote that steps 71-74 may be executed for each client that has a session with the Telnet server 14 and that subsequent steps 78, 75, 76, and 77 are intended to be applied to all such active clients (i.e., clients in session with the Telnet server 14) collectively. Thus, in steps 78, 75, 76, and 77, the "client" or the client 36 represents each such active client.

In step 78, a system application is being executed. Step 75 determines whether a condition involving the logical subsystem of the session being processed is satisfied. In a first example, the condition to be tested may be the condition that the logical subsystem denotes the Eastern time zone. In this first example, the condition to be tested in step 75 enables the system application to identify clients in the Eastern time zone for any purpose such as for backing up the client's data (wherein said client's data is stored at the server computer system 12) at the end of the day at 9 PM local client time while taking no such action for clients in other time zones where the time is not 9 PM local client time. In a second example, the condition to be tested may be the condition that the logical subsystem is one of: the Eastern time zone, the Central time zone, and the Mountain time zone. Generally, the condition involving the logical subsystem that is tested in step 75 can be any desired condition involving said logical subsystem. If the condition involving the logical subsystem in step 75 is satisfied, then step 76 is executed. Step 76 takes an action with respect to the client, said action being relating to the condition that has been satisfied.

Thus in the first example discussed supra relating to FIG. 7, if the logical subsystem denotes the Eastern time zone and the condition involving the logical subsystem has been satisfied, then the system application could take an action to transmit a message to the client 36 instructing the client 36 to terminate the session in X minutes (e.g., 5 minutes, 10 minutes, etc.) so that the system application could initiate backing up the client's data. If the client 36 does not so terminate the session within said X minutes, then the system application could assertively terminate the session; alternatively the system administrator could assertively terminate the session either manually or by use of software. Next the session is continued in step 77.

Figure 8:
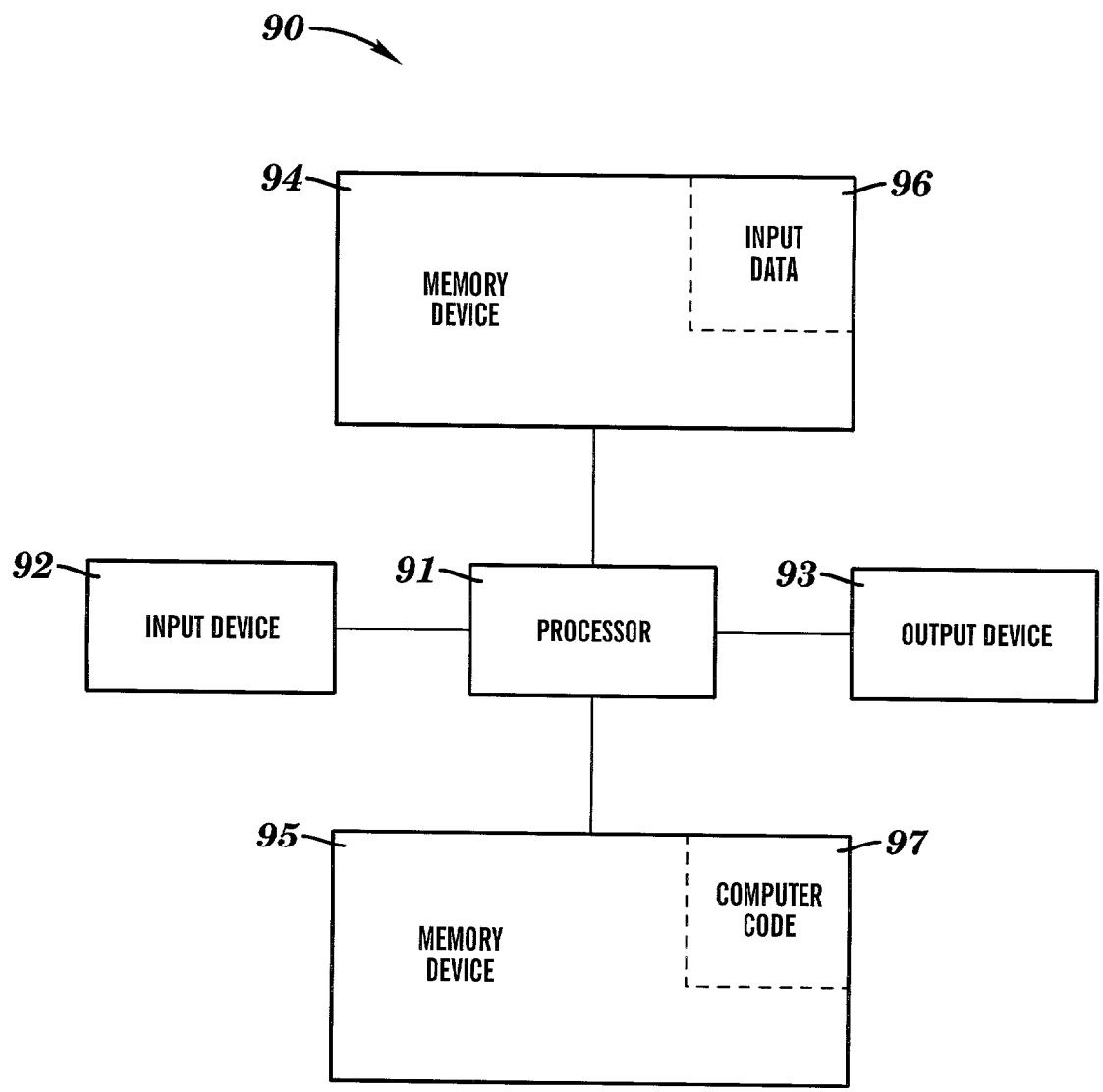
FIG. 8 depicts a computer system associated with a server of a client-server communication system, in accordance with embodiments of the present invention.

FIG. 8 depicts a computer system 90 associated with a server of a client-server communication system, in accordance with embodiments of the present invention. FIG. 8 represents a server computer system analogous to the server computer system 12 of the client-server communication system 10 of FIG. 2 or FIG. 5, such that the computer system 90 of FIG. 8 depicts more hardware than does the server computer system 12 of FIG. 2 or FIG. 5. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97. The computer code 97 includes computer software adapted to be initiated from within the computer system 90 during a communication session between the server (analogous to the Telnet server 14 of FIG. 2 or FIG. 5) of the computer system 90 and a client (analogous to the client 36 or 38 of FIG. 2 or FIG. 5). The computer software of the computer code 97 is analogous to the applications 33 of FIG. 2 or FIG. 5 and represents a client application or a system application as described supra. The processor 91 executes the computer code 97. The memory device 94 includes input data 96. The input data 96 includes input required by the computer code 97. The output device 93 displays output from the computer code 97.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A client-server communication method, comprising:
receiving, by a server from a client over a communication path and during a communication session between the client and the server, a negotiated time-zone value that identifies a time zone or the client, wherein receiving the negotiated time-zone value includes receiving the negotiated time-zone value in a storage area of a computer system that includes the server,
said method further comprising during the session executing on the server an application initialed by the client or initiated from within the computer system, wherein executing the application includes:
retrieving the time-zone value from the storage area; and
determining whether to take an action relating to the client based on whether a condition involving the retrieved time-zone value is satisfied, wherein to take an action relating to the client comprises at least one of: to communicate a message to the client and to terminate the session.

2. The method of claim 1, wherein executing the application was initiated from within the computer system.

3. The method of claim 1, wherein executing the application was initiated by the client.

4. A client-server communication method, comprising
receiving, by a server from a client over a communication path and during a communication session between the client and the server, a negotiated time-zone value that identifies a time zone of the client, wherein receiving the negotiated time-zone value includes receiving the negotiated time-zone value in a storage area of a computer system that includes the server, and wherein the method further comprises executing on the server during the session a device manager of the computer system, wherein executing the device manager includes routing the session to a logical subsystem that is keyed to the negotiated time-zone value; and
executing on the server during the session an application initiated by the client or from within the computer system, wherein executing the application initiated by the client or from within the computer includes determining whether to take an action relating to the client based on whether a condition is satisfied, and wherein the condition involves the logical subsystem to which the session is routed, wherein to take an action relating to the client comprises at least one of: to communicate a message to the client and to terminate the session.

5. The method of claim 4, wherein receiving the negotiated time-zone value includes receiving the negotiated time-zone value through use of an environment variable as a negotiated option.

6. The method of claim 4, wherein the client is a Telnet client, and wherein the server is a Telnet server.

7. The method of claim 4, wherein the communication path includes a TCP/IP network, and wherein the client is directly connected to the server via the TCP/IP network while the time-zone value is negotiated between the client and the server.

8. The method of claim 4, wherein the application is initiated by the client.

9. The method of claim 4, wherein the application is initiated from within the computer system.

10. A client-server communication system comprising a server, wherein the server is adapted to receive from a client, in a storage area of a computer system that comprises the server and over a communication path between the client and the server and during a communication session between the client and the server, a negotiated time-zone value that identifies a time zone of the client, wherein the server is adapted to execute during the session an application initiated by the client or initiated from within the computer system, and wherein to execute the application includes:
to retrieve the time-zone value from the storage area; and
to determine whether to take an action relating to the client based on whether a condition involving the retrieved time-zone value is satisfied, wherein to take an action relating to the client comprises at least one of: to communicate a message to the client and to terminate the session.

11. The system of claim 10, wherein the server is adapted to execute during the session the application initiated from within the computer system.

12. The system of claim 10, wherein the server is adapted to execute during the session the application initiated by the client.

13. A client-server communication system comprising a server, wherein the server is adapted to receive from a client, in a storage area of a computer system that comprises the server and over a communication path between the client and the server and during a communication session between the client and the server, a negotiated time-zone value that identifies a time zone of the client, wherein the server is further adapted to execute on the server during the session a device manager of the computer system, wherein to execute the device manager includes: to route the session to a logical subsystem that is keyed to the negotiated time-tone value, wherein the server is further adapted to execute on the server during the session an application initiated by the client or from within the computer system, wherein to execute the application initiated by the client or from within the computer system includes to determine whether to take an action relating to the client base on whether a condition is satisfied, and wherein the condition involves the logical subsystem to which the session is routed, and wherein to take an action relating to the client comprises at least one of: to communicate a message to the client and to terminate the session.

14. The system of claim 13, wherein to receive comprises to receive the negotiated time-zone value through use of an environment variable as a negotiated option.

15. The system of claim 13, wherein the client is a Telnet client, and wherein the server is a Telnet server.

16. The system of claim 13, wherein the communication path includes a TCP/IP network, and wherein the client is directly connected to the server via the TCP/IP network while the time-zone value is negotiated between the client and the server.

17. The system of claim 13, wherein the application is initiated by the client.

18. The system of claim 13, wherein the application is initiated from within the computer system.

19. A computer program product, comprising a computer usable storage medium having a computer readable program code stored therein, wherein the computer readable program code comprises a software application adapted to be initiated by a client of client-server communication system during a communication session between the client and a server of the client-server communication system, wherein the client-server communication system has a communication path between the client and the server, wherein the software application is further adapted to execute on the server during the communication session, and wherein to execute the software application includes to make a decision relating to a negotiated time-zone value that identifies a time zone of the client, wherein to make a decision relating to the negotiated time-zone value comprises to determine whether to take an action relating to the client based on whether a condition is satisfied, and wherein to take an action relating to the client comprises at least one of: to communicate a message to the client and to terminate the session.

20. The computer program product of claim 19, wherein:
 the condition involves the negotiated time-zone value retrieved from a storage area of the computer system.

21. The computer program product of claim 19, wherein the condition involves a logical subsystem to which the session is routed, and wherein the logical subsystem is keyed to the negotiated time-zone value.

22. The computer program product of claim 19, wherein the client is a Telnet client, and wherein the server is a Telnet server.

23. The computer program product of claim 19, wherein the communication path includes a TCP/IP network, and wherein the client is directly connected to the server via the TCP/IP network while the time-zone value is negotiated between the client and the server.

24. A computer program product, comprising a computer usable storage medium having a computer readable program code stored therein, wherein the computer readable program code comprises a software application adapted to be initiated from within a computer system that includes a server of a client-server communication system during a communication session between the server and a client of the client-server communication system, wherein the client-server communication system has a communication path between the client and the server, wherein the software application is further adapted to execute on the server during the communication session, and wherein to execute the software application includes to make a decision relating to a negotiated time-zone value that identifies a time zone of the client, wherein to make a decision relating to the negotiated time-zone value comprises to determine whether to take an action relating to the client based on whether a condition is satisfied, and wherein to take an action relating to the client comprises at least one of: to communicate a message to the client and to terminate the session.

25. The computer program product of claim 24, the condition involves the negotiated time-zone value retrieved from a storage area of the computer system.

26. The computer program product of claim 24, wherein the condition involves a logical subsystem to which the session is routed, and wherein the logical subsystem is keyed to the negotiated time-zone value.

27. The computer program product of claim 24, wherein the client is a Telnet client, and wherein the server is a Telnet server.

28. The computer program product of claim 24, wherein the communication path includes a TCP/IP network, and wherein the client is directly connected to the server via the TCP/IP network while the time-zone value is negotiated between the client and the server.

* * * * *